US010154111B2

(12) United States Patent
Karasaridis et al.

(10) Patent No.: US 10,154,111 B2
(45) Date of Patent: *Dec. 11, 2018

(54) SYSTEM AND METHOD FOR ROUTING CONTENT BASED ON REAL-TIME FEEDBACK (71) Applicant: AT&T INTELLECTUAL PROPERTY I, L.P., Atlanta, GA (US)

(72) Inventors: Anestis Karasaridis, Oceanport, NJ (US); David A. Hoeflin, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/044,630

(22) Filed: Feb. 16, 2016

(65) Prior Publication Data
US 2016/0164997 A1 Jun. 9, 2016

Related U.S. Application Data (63) Continuation of application No. 13/432,447, filed on Mar. 28, 2012, now Pat. No. 9,307,044.

(51) Int. Cl.
| G06F 15/167 | (2006.01) |
| H04L 29/08 | (2006.01) |
| H04N 21/218 | (2011.01) |
| H04N 21/231 | (2011.01) |
| H04N 21/647 | (2011.01) |
| H04L 12/26 | (2006.01) |
| H04L 12/717 | (2013.01) |
| H04L 29/12 | (2006.01) |

(52) U.S. Cl.
CPC .......... *H04L 67/2842* (2013.01); *H04L 43/16* (2013.01); *H04L 45/42* (2013.01); *H04L 61/1511* (2013.01); *H04L 67/2847* (2013.01); *H04N 21/2181* (2013.01); *H04N 21/23103* (2013.01); *H04N 21/23106* (2013.01); *H04N 21/23116* (2013.01); *H04N 21/64738* (2013.01)

(58) Field of Classification Search
CPC ......... H04L 29/08153; H04L 29/08162; H04L 29/08171; H04L 29/08198; H04L 29/08189
See application file for complete search history.

(56) References Cited

U.S. PATENT DOCUMENTS

| 6,839,700 B2* | 1/2005 | Doyle | H04L 29/06 707/719 |
| 7,177,901 B1* | 2/2007 | Dutta | H04L 67/1002 709/203 |
| 7,912,954 B1* | 3/2011 | Oesterreicher | H04L 67/1008 709/226 |
| 2002/0163926 A1* | 11/2002 | Moharram | H04L 63/1408 370/428 |

(Continued)

*Primary Examiner* — Dhairya A Patel
(74) *Attorney, Agent, or Firm* — Akerman LLP; Michael K. Dixon; Mammen (Roy) P. Zachariah, Jr.

(57) ABSTRACT

A method includes receiving at a cache server a content request from a client system, determining that the cache server is overloaded in response to receiving the content request, and in response to determining that the cache server is overloaded, returning to the client system a domain redirection response including a load status of the cache server.

20 Claims, 6 Drawing Sheets (56) References Cited

U.S. PATENT DOCUMENTS

| | | | |
|---|---|---|---|
| 2003/0110296 A1* | 6/2003 | Kirsch | H04L 29/06 709/246 |
| 2005/0010653 A1* | 1/2005 | McCanne | H04L 12/1877 709/219 |
| 2009/0077247 A1 | 3/2009 | Bouazizi et al. | |
| 2010/0042743 A1 | 2/2010 | Jeon et al. | |
| 2010/0103925 A1 | 4/2010 | Birch et al. | |
| 2010/0223364 A1* | 9/2010 | Wei | H04L 29/04 709/220 |
| 2010/0266111 A1 | 10/2010 | Crausaz et al. | |
| 2011/0164610 A1 | 7/2011 | Cabasse et al. | |
| 2011/0231475 A1* | 9/2011 | Van der Merwe | H04L 29/12066 709/203 |
| 2011/0258272 A1* | 10/2011 | Drako | G06Q 10/107 709/206 |
| 2011/0295990 A1 | 12/2011 | St Jean et al. | |
| 2013/0262697 A1* | 10/2013 | Karasaridis | H04L 67/2847 709/242 |

\* cited by examiner

SYSTEM AND METHOD FOR ROUTING CONTENT BASED ON REAL-TIME FEEDBACK

CROSS-REFERENCE TO RELATED APPLICATION(S)

This application claims priority to and is a continuation of U.S. patent application Ser. No. 13/432,447, filed on Mar. 28, 2012, which is herein incorporated by reference in its entirety.

FIELD OF THE DISCLOSURE

The present disclosure generally relates to communications networks, and more particularly relates to a system and method for routing content based on real-time feedback.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
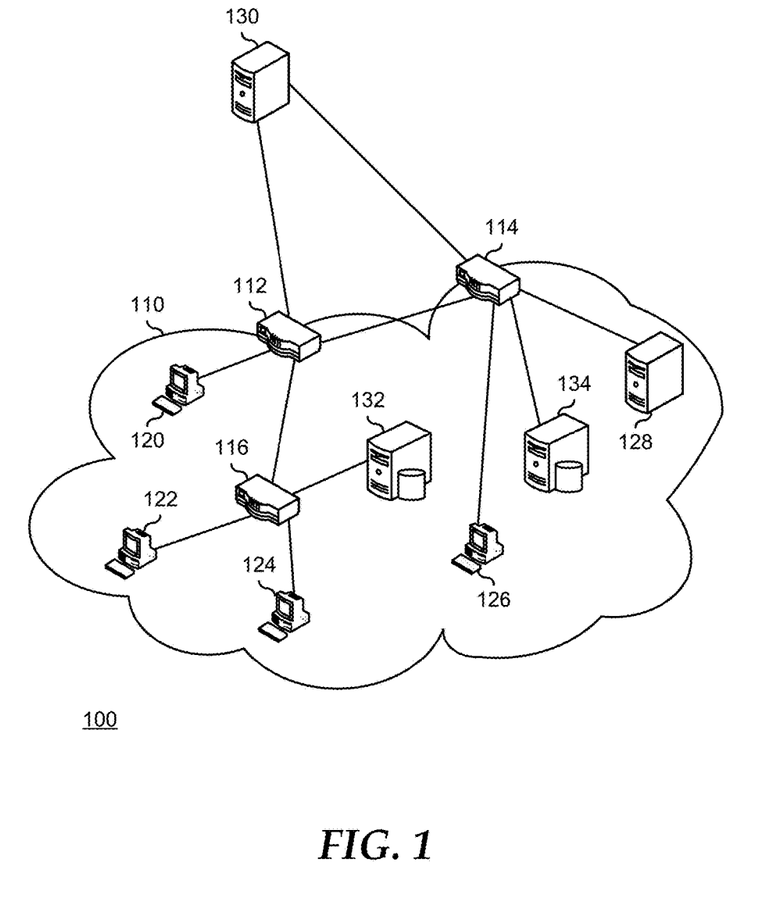
FIG. 1 is a block diagram illustrating a communications network in accordance with an embodiment of the present disclosure.

FIG. 1 illustrates a geographically dispersed network 100, such as the Internet, including an autonomous system (AS) 110 and a content server 130. AS 110 includes routers 112, 114, and 116, client systems 120, 122, 124, 126, and 128, a domain name system (DNS) server 128, and cache servers 132 and 134. Routers 112, 114, and 116 communicate with each other and connect to other ASs through peering points at routers 112 and 114. Client systems 120, 122, 124, and 126 are connected to respective routers 112, 114, and 116 to access network 100, such that router 112 provides ingress and egress for client system 120, router 114 provides ingress and egress for client system 126, and router 116 provides ingress and egress for client systems 122 and 124. DNS server 128 translates human readable hostnames, such as www.att.com, into associated Internet Protocol (IP) addresses. For example, client system 126 can send a request to resolve a hostname to DNS server 128. DNS server 128 can provide client system 126 with an IP address corresponding to the hostname. DNS server 128 provides the IP address from a cache of hostname/IP address pairs when the hostname provided by client system 126 is in the cache. Otherwise, DNS server 128 requests the IP address corresponding to the hostname from an authoritative DNS server for the domain to which the hostname belongs.

Client systems 120, 122, 124, and 126 retrieve information from content server 130. For example, client system 120 can retrieve a web page provided by content server 130. Additionally, client systems 120, 122, 124, and 126 download content files, such as graphics, audio, and video content, and program files such as software updates, from content server 130. The time required for client systems 120, 122, 124, and 126 to retrieve the information from content server 130 is related to the size of the file, the distance the information travels, and congestion along the route. Additionally, the load on the server 130 is related to the number of client systems 120, 122, 124, and 126 that are actively retrieving information from content server 130. As such, the resources such as processor, memory, and bandwidth available to content server 130 limits the number of client systems 120, 122, 124, and 126 that can simultaneously retrieve information from the content server.

Cache servers 132 and 134 replicate content from content server 130 in order to locate the content closer to client systems 120, 122, 124, and 126. Cache server 132 is connected to router 116, and cache server 134 is connected to router 114. Client systems 120, 122, 124, and 126 are each directed to one of cache servers 132 or 134 to obtain the content that is replicated in the cache servers, in order to decrease the time needed to retrieve the content. In a particular embodiment, a cache server 132 or 134 is selected that is closer to a particular client system 120, 122, 124, or 126. The cache server 132 or 134 that is closer to a particular client system 120, 122, 124, or 126 is determined based upon a network cost between the cache server and the client system. The network cost is determined based on a shortest link distance, a lowest transport cost, a lowest network latency, a highest link capacity, a lowest load, another measure of network distance, or a combination thereof. As such, the network distance between cache servers 132 and 134, and client systems 120, 122, 124, and 126 can be different from the geographic distance. For example, client systems 122 and 124 obtain content from cache server 132, and client system 126 can obtain content from cache server 134. Further, the network cost for client system 120 to obtain content from either of cache servers 132 or 134a can be substantially identical. Here, when the network cost associated with the link between routers 112 and 116 is marginally lower than the network cost associated with the link between routers 112 and 114, client 120 will obtain content from cache server 132.

When client system 120 sends a content request to cache server 132, the cache server determines if the content is stored in its cache. If so, cache server 132 provides the content to client system 120. In a particular embodiment, when the content is not stored in the cache of cache server 132, the cache server retrieves the content from content server 130, and then provides the content to client system 120. In another embodiment, when the content is not stored in the cache of cache server 132, the cache server attempts to retrieve the content from cache server 134 prior to retrieving the information from content server 130. Cache server 132 retrieves the content from content server 130 one time, thereby reducing the load on content server 130 and network 100.

In a particular embodiment, cache servers 132 and 134 have caches of limited size. The addition of new content to a cache may require old content to be removed from the cache. The cache may utilize a least recently used (LRU) policy, a least frequently used (LFU) policy, another cache policy, or a combination thereof. When the addition of relatively cold or less popular content to a cache causes relatively hot or more popular content to be removed from the cache, an additional request to retrieve the relatively hot content increases the time required to provide the relatively hot content to client systems 120, 122, 124, and 126. To minimize the network cost and maximize the time savings of providing content from a cache, the most popular content is stored in the cache, while less popular content is retrieved from content server 130.

Figure 2:
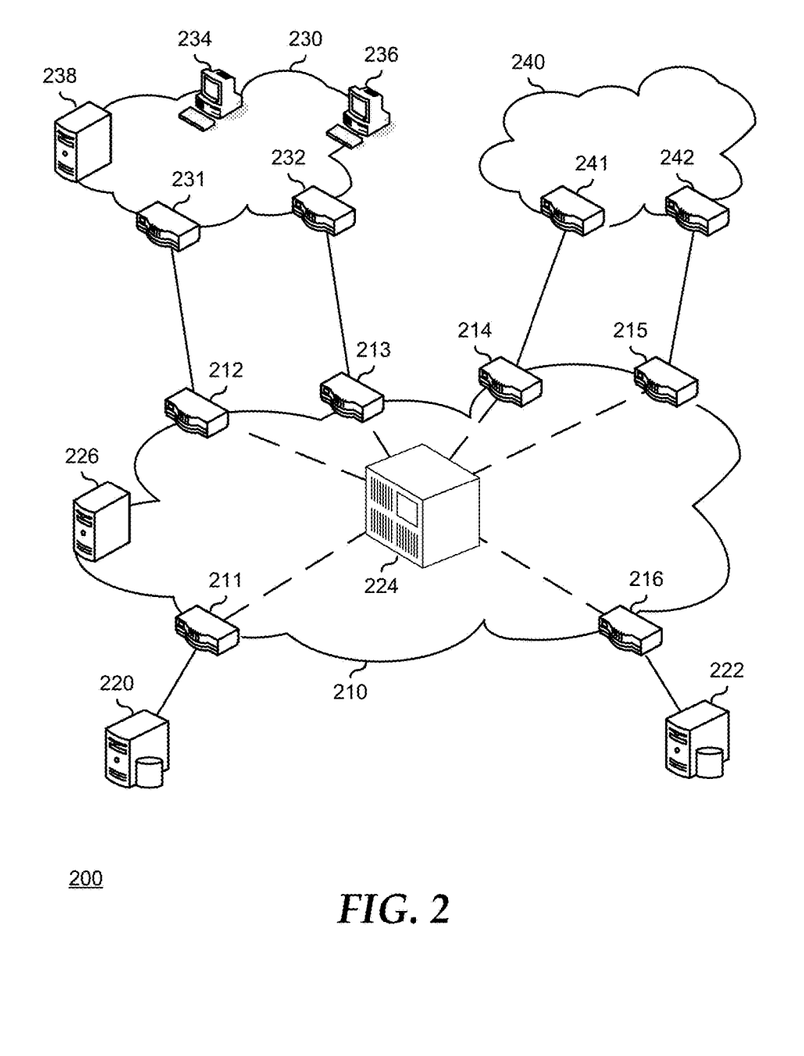
FIG. 2 is a block diagram illustrating a CDN system in accordance with an embodiment of the present disclosure.

FIG. 2 illustrates a CDN system 200 that can be used in conjunction with communications network 100. CDN system 200 includes a CDN provider network 210, an AS 230, and an AS 240. CDN provider network 210 includes provider edge routers 211, 212, 213, 214, 215, and 216, cache servers 220 and 222, a route controller 224, and an authoritative DNS 226. AS 230 includes edge routers 231 and 232, client systems 234 and 236, and a local DNS server 238. AS 240 includes edge routers 241 and 242. Provider edge routers 211, 212, 213, 214, 215, and 216 serve as ingress points for traffic that is destined for CDN provider network 210, and egress points for traffic from CDN provider network 210 that is destined for the rest of the Internet. Cache server 220 receives traffic from CDN provider network 210 through provider edge router 211, and cache server 222 receives traffic from CDN provider network 210 through provider edge router 216. In addition to providing CDN service to clients within CDN provider network 210, CDN system 200 provides CDN service to clients within AS 230 and within AS 240. Requests for content from systems within either AS 230 or AS 240 enter the CDN provider network through the appropriate peering points and are directed to either cache server 220 or 222.

Route controller 224 exchanges routes with provider edge routers 212, 213, 214, and 215 within CDN provider network 210. As such, route controller 224 influences the routes selected by provider edge routers 212, 213, 214, and 215. Additionally, route controller 224 receives load information from cache servers 220 and 222. The load information includes information regarding available bandwidth, bandwidth utilization, central processing unit (CPU) utilization, memory utilization, number of requests being served, other load information, or a combination thereof. Cache servers 220 and 222 advertise a shared anycast address to CDN provider network 210. For example, cache servers 220 and 222 can advertise the shared anycast address through Border Gateway Protocol (BGP) or another routing protocol, as needed or desired. Specifically, cache servers 220 and 222 advertise the shared anycast address to provider edge routers 211 and 216. Provider edge routers 211 and 216 advertise the anycast address to route controller 224, and the route controller provides a route to the anycast address to each of provider edge routers 212, 213, 214, and 215. Provider edge routers 212, 213, 214, and 215 direct traffic addressed to the anycast address to cache server 220 or 222 based on the routes provided by route controller 224. Additionally, provider edge routers 212, 213, 214, and 215 advertise the anycast address to AS 230 and to AS 240. Route controller 224 manipulates the routes provided to provider edge routers 212, 213, 214, and 215 based on the load on cache servers 220 and 222, network bandwidth, network cost, network distance, or any combination thereof. Altering the route to the anycast address can change which of cache servers 220 and 222 serve content to client systems within the CDN provider network 210, AS 230, and AS 240.

In a particular embodiment, AS 230 is an unstable network. As such, traffic from client systems 234 and 236 can enter CDN provider network 210 at both provider edge routers 212 and 213. Anycast traffic entering CDN provider network 210 at provider edge router 212 can be directed to cache server 220 while anycast traffic entering at provider edge router 213 can be directed to cache server 222. Internal routing changes within AS 230 can also cause traffic from client systems 234 or 236 to be shifted from cache server 220 to cache server 222, resulting in disruptions to persistent and secure connections. In another embodiment, a unicast address to cache servers 220 or 222 is provided to client systems 234 and 236. Client systems 234 and 236 can receive the unicast address indirectly through local DNS server 238. When authoritative DNS server 226 receives a request for a cache server address from local DNS server 238, authoritative DNS server 226 may not be aware of the number of client systems 234 and 236 that are served by local DNS server 238, the location of the client systems relative to the local DNS server, or the ingress point for the client systems. As such, it may not be possible for authoritative DNS server 226 to optimize routing of the client request to the closest cache server 220 or 222, or to properly load balance among the cache servers.

Figure 3:
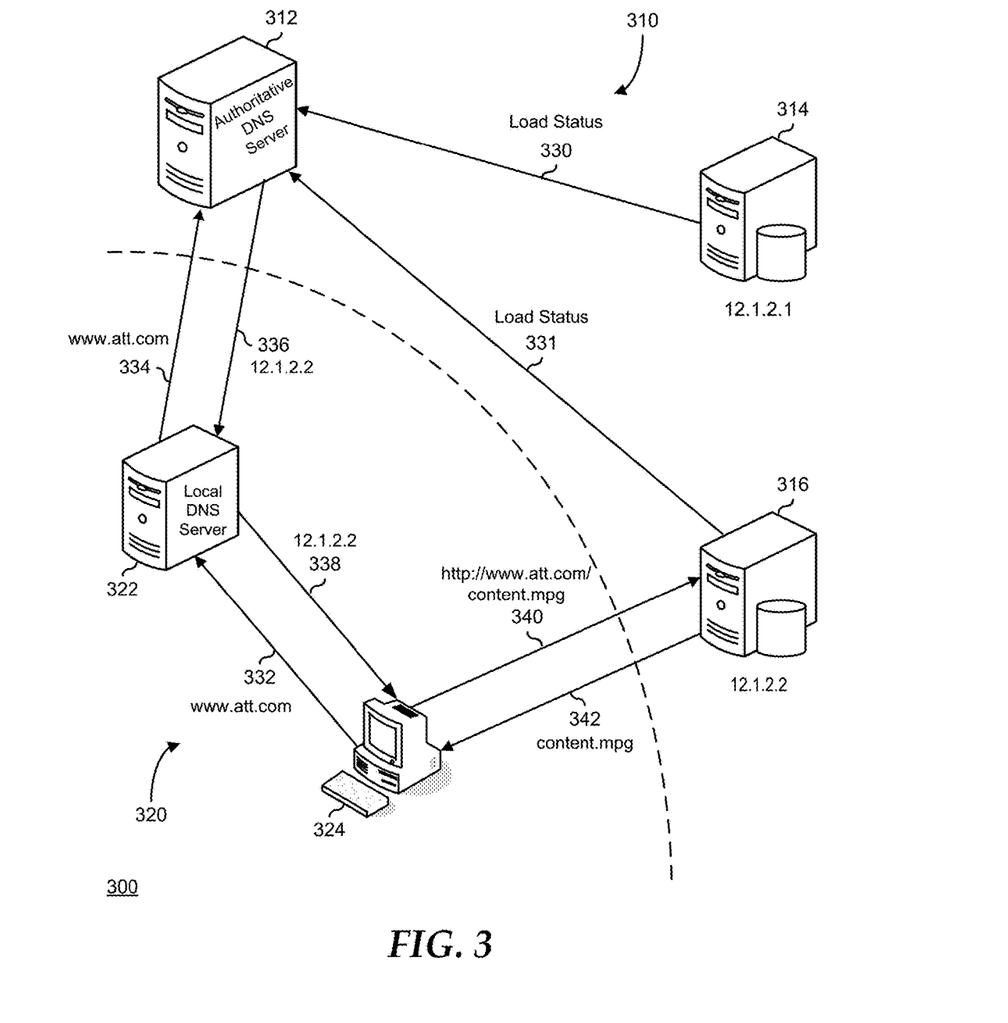
FIGS. 3 and 4 are block diagrams illustrating content request flows in the CDN system of FIG. 2.
Figure 4:
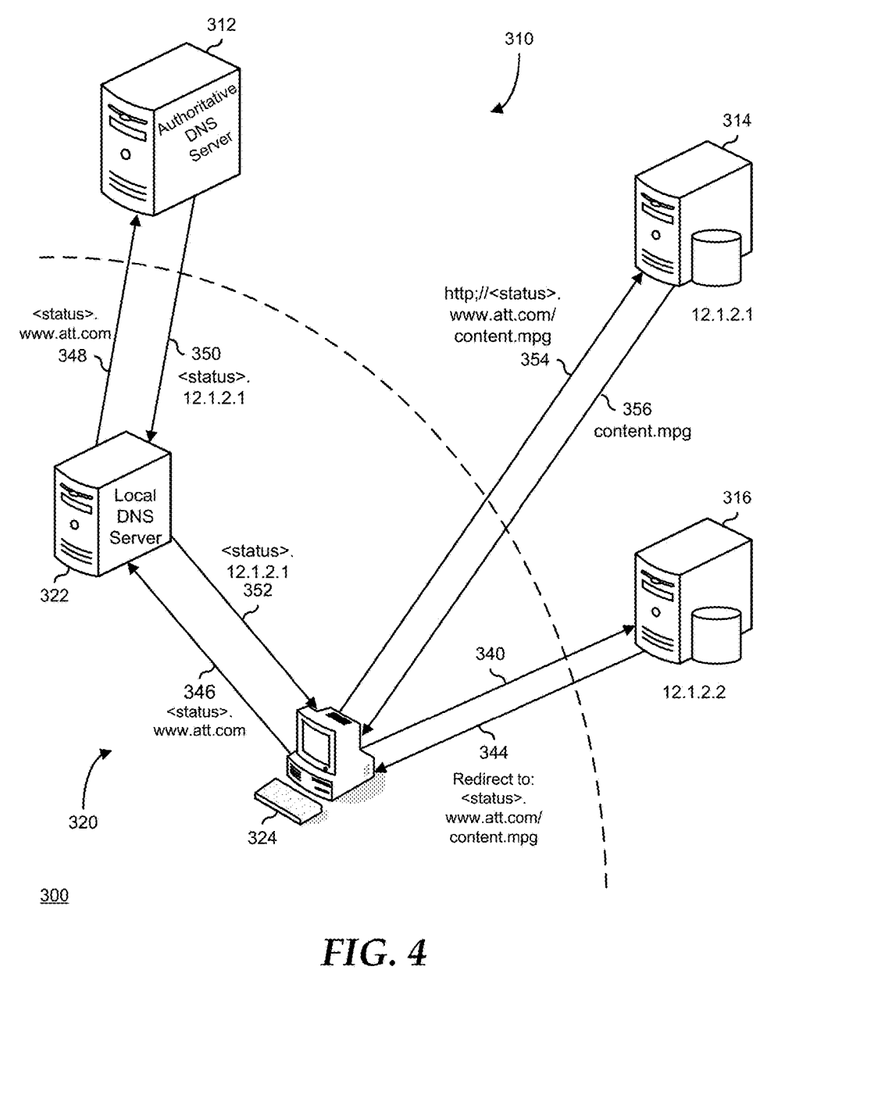

FIGS. 3 and 4 illustrate a CDN system 300 similar to CDN system 200, including a CDN provider network 310 and an AS 320. CDN provider network 210 includes an authoritative DNS server 312 and cache servers 314 and 316. AS 320 includes a local DNS server 322 and a client system 324. Content routing decisions in CDN system 310 are made such that, when cache server 314 can provide content to client system 324 for a lower network cost, then cache server 314 is selected to provide the content thereon to the client system, and when cache server 316 can provide content to the client system 324 at a lower network cost, then cache server 316 is selected to provide the content thereon to the client system. As noted above, the network cost can be determined based on a lowest cache server load, among other factors.

Cache server 314 operates to determine a load condition for the cache server, based upon the number of content requests received, the size of the content items that are requested, and the network conditions between the cache server and client system 324. Based upon the load condition for cache server 314, there may be times when the cache server is more readily available to service content requests and other times when the cache server is less readily available to service content requests. In response, cache server 314 generates load status information that includes the load condition for the cache server, and provides a load status update 330 to authoritative DNS server 312. Similarly, cache server 316 determines a load condition, generates load status information, and provides a load status update 331 to authoritative DNS server 312. In a particular embodiment, cache server 314 provides load status update 330 when there is a change in the load condition on cache server 314, and cache server 316 provides load status update 331 when there is a change in the load condition on cache server 316. In another embodiment, cache server 314 and 316 each provide respective load status updates 330 and 331 on a periodic basis. In yet another embodiment, authoritative DNS server 312 polls cache servers 314 and 316 to provide respective load status updates 330 and 331. Authoritative DNS server 312 uses load status updates 330 and 331 in determining the network cost for providing content from each of cache servers 314 and 316, and based upon the network costs the authoritative DNS server makes routing decisions. In a particular embodiment, another device of CDN provider network 310 operates to receive load status updates 330 and 331, to determine the network cost for each of cache servers 314 and 316, to make the routing decisions, and to provide the resulting routing information to authoritative DNS server 312.

CDN provider network 310 operates to provide content to AS 320. In particular, client system 324 can request content based upon a domain name that is associated with CDN provider network 310, but the client system may not know the Internet protocol (IP) address associated with the domain name, and therefore may be unable to directly retrieve the content. When client system 324 cannot directly determine an IP address associated with a domain name, the client system sends a DNS resolution request 332 to local DNS server 322. For example, client system 324 can send DNS resolution request 332 in order to have local DNS server 322 resolve "www.att.com into an IP address from which to retrieve a video titled "content.mpg." If local DNS server 322 does not include the IP address associated with the domain name received from client system 324, then the local DNS server forwards a recursive DNS resolution request 334 to authoritative DNS server 312.

Authoritative DNS server 312 resolves recursive DNS request 334 based upon a determination of which cache server 314 or 316 can provide the requested content at the lowest network cost, and returns a DNS reply 336 to local DNS server 322 that includes the IP address of the selected cache server. The local DNS server 322 then forwards DNS reply 338 to client system 324. For example, authoritative DNS server 312 can send DNS reply 336 that includes "12.1.2.2," that is the IP address of cache server 316, as the source for the requested content, and the DNS reply 338 can be returned to client system 324. Client system 324 then sends a content request 340 to cache server 316, and when the cache server is able to service the content request, the cache server responds by sending the requested content 342 to the client system. For example, client system 324 can issue content request 340 including "http://www.att.com/content.mpg" to cache server 316 (i.e., to the IP address "12.1.2.2").

In a particular embodiment, in an interim between a time when cache server 316 provides load status update 331 to authoritative DNS server 312, and a later time when the cache server receives content request 340, the load condition for the cache serve can have changed, such that the cache server is no longer able to service the content request. For example, cache server 316 can have received a large number of intervening content requests from other client systems of AS 310, can have received content requests for large content files, can have determined that a network path for providing the content has become overloaded, can otherwise determine that the cache server is unable to service the content request, or a combination thereof. In this case, cache server 316 sends a domain redirection 344 to client system 324. Here, domain redirection 344 includes an encoded status string that includes information related to the load condition on cache server 316, which is appended to the original domain name request from client system 324. For example, cache server 316 can send a Hyper-Text Transport Protocol (HTTP) domain redirection 344 message including a redirect to "<status>.www.att.com/content.mpg."

The status string encodes load condition information for cache server 316, and can include a cache server identifier, a busy field, an overload field, a counter, a client IP address, another field related to the load condition on the cache server, or a combination thereof. The cache server identifier can include the IP address for cache server 316, or another identifier that serves to indicate which cache server 314 or 316 is the source of the domain redirection 344. The busy field indicates that the identified cache server is overloaded, and the overload field provides a quantitative indication as to how overloaded the cache server is. For example, the overload field can include a percentage over a nominal value, or another quantitative indication as to how overloaded the cache server is. The counter is used to indicate a number of domain redirections that the content request has experienced, in order to prevent request loops when both cache servers 314 and 316 are overloaded. For example, cache server 316 can initialize the counter to "0" when the domain redirection is the initial domain redirection experienced by the content request, and if cache server 314 subsequently receives the domain redirection, cache server 314 can increment the counter to "1." The client IP address can be included to permit authoritative DNS server 312 to better select a cache server 314 or 316 to service the content request, as described below. In a particular embodiment, the status string is encrypted in order for cache server 316 to securely send the load status information over the network of AS 320. For example, the status string can be encrypted using the Advanced Encryption Standard (AES), a hash standard such as SHA-1 or SHA-2, the X.509 Public-Key Infrastructure (PKI) standard, or another encryption standard, as needed or desired.

When client system 324 receives domain redirection 344, the client system does not know the IP address associated with the received domain name. In particular, client system 324 cannot resolve the status string appended to the original domain name request, and the client system is therefore unable to directly retrieve the content. Therefore, client system 324 sends a new DNS resolution request 346 to local DNS server 322 including the original domain name request, but with the addition of the status string. For example, client system 324 can send DNS resolution request 346 in order to have local DNS server 322 resolve "<status>.www.att.com"

into an associated IP address. Local DNS server 322 will have cached the IP address associated with the domain name "www.att.com," but will be unable to resolve DNS resolution request 346 because of the addition of the status string. Therefore, local DNS server 322 forwards a recursive DNS resolution request 348 including the status string to authoritative DNS server 312.

Authoritative DNS server 312 receives recursive DNS request 348, and recognizes the status string as including a status string, and decodes the status string to determine the included cache server identifier, the busy field, the overload field, the counter, the client IP address, and any other fields related to the load condition on cache server 316. Authoritative DNS server 312 uses the load status information in re-determining the network cost for providing content from each of cache servers 314 and 316, and based upon the re-determined network costs the authoritative DNS server makes new routing decisions. Authoritative DNS server 312 then resolves recursive DNS request 348 based upon the re-determination, and returns a DNS reply 350 to local DNS server 322 that includes the IP address of the newly selected cache server, and local DNS server 322 forwards DNS reply 352 to client system 324. For example, authoritative DNS server 312 can send DNS reply 350 that includes "<status>.12.1.2.1," that is the IP address of cache server 314, as the source for the requested content, and the DNS reply 352 can be returned to client system 324. In this way, authoritative DNS system 312 receives real-time load status updates from cache servers 314 and 316, and can be kept current on the load conditions on CDN provider system 310 in a timelier manner than by relying on load status updates 330 and 331 alone. Client system 324 then sends a content request 354 to cache server 314, and when the cache server is able to service the content request, the cache server responds by sending the requested content 356 to the client system. For example, client system 324 can issue content request 354 including "http://<status>.www.att.com/content.mpg" to cache server 316 (i.e., to the IP address "12.1.2.1").

Here too, in an interim between a time when cache server 314 provides load status update 332 to authoritative DNS server 312, and a later time when the cache server receives content request 354, the load condition for the cache serve can have changed, such that the cache server is no longer able to service the content request. In this case, cache server 314 sends a new domain redirection that is similar to domain redirection 344 (not illustrated) to client system 324. Here, the new domain redirection includes an encoded status string that includes information related to the load condition on cache server 314, which is appended to the domain name request from client system 324. In a particular embodiment, cache server 314 appends a second status string such that the domain redirection includes two status strings: the status string included by cache server 316, and a second status string included by cache server 314. For example, cache server 314 can send an HTTP domain redirection message including a redirect to "<status-2>. <status>.www.att.com/content.mpg." In another embodiment, cache server 314 decodes the first status string to determine the value included in the counter and determines if the value is greater than a counter thresholds such that, when the counter value received in the content request is greater than the counter threshold, then the cache server will provide the content, even if the cache server is overloaded. If the counter value received in the content request is not greater than the counter threshold, cache server 316 increments the counter by one "1" and includes the resulting counter value in the decoded status string for the cache server. For example, cache server 314 can send an HTTP domain redirection message including a redirect to "<status-2>.www.att.com/content.mpg."

In another embodiment, authoritative DNS server 312 re-encodes the status string received in DNS request 348 to include a maximum counter value that forces the identified cache server 314 or 316 to service the content request. For example, after receiving recursive DNS request 348, authoritative DNS server 312 can still determine that the network cost of providing the requested content is still lowest when provided from cache server 316. This may be because of other conditions on CDN provider system 310 that result in cache server 314 being more overloaded than cache server 316. Thus, the inclusion of the maximum counter value with DNS reply 350 can operate to force the selected cache server 314 or 316 to service the request. For example, cache servers 314 and 316 can determine that the maximum counter value is included in the received content request, and thus determine that the maximum counter value is greater than the counter threshold, and the cache server will provide the content, even if the cache server is overloaded.

Figure 5:
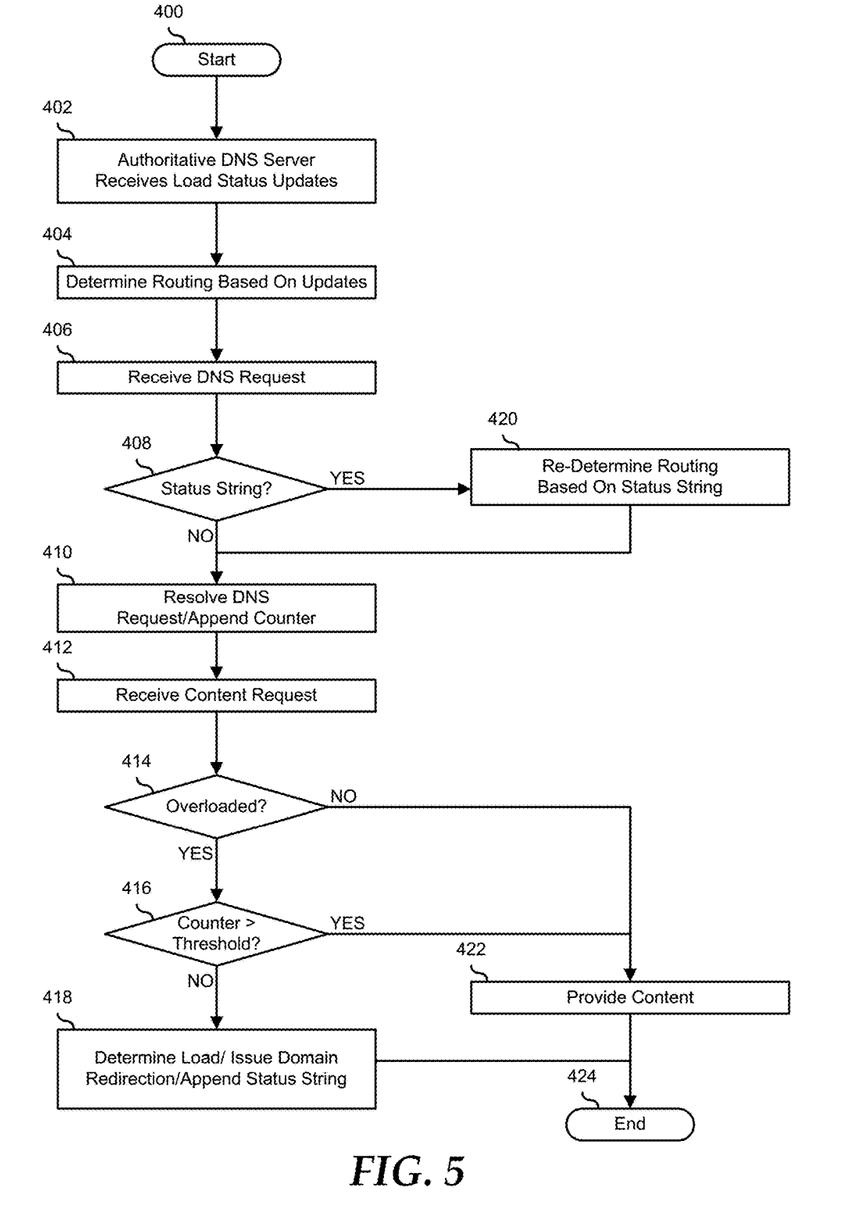
FIG. 5 is a flow diagram illustrating a method for routing content based on real-time feedback.

FIG. 5 illustrates a method for routing content based on real-time feedback, starting at block 400. An authoritative DNS server for a CDN provider system receives load status updates from the cache servers associated with the CDN provider system in block 402. For example, cache servers 314 and 316 can determine their load conditions and provide load status updates 330 and 331 to authoritative DNS server 312. The authoritative DNS server determines the routing behavior for the CDN provider system based upon the load status updates in block 404. Thus authoritative DNS server 312 can use load status updates 330 and 331 in determining the network cost for providing content from each of cache servers 314 and 316, and based upon the network costs the authoritative DNS server can make routing decisions. The authoritative DNS server receives a DNS request in block 406, and a decision is made as to whether or not the DNS request includes a status string in decision block 408. For example, authoritative DNS server 312 can receive a DNS request that does not include a status string, such as in DNS request 334, or the authoritative DNS server can receive a DNS request that includes a status string, such as in DNS request 348.

If the DNS request does not include a status string, the "NO" branch of decision block 408 is taken, and the method proceeds to block 410, as described below. If the DNS request includes a status string, the "YES" branch of decision block 408 is taken, the authoritative DNS server determines the routing behavior for the CDN provider system based upon the information included in the status string in block 420, and the method proceeds to block 410. In block 410 the authoritative DNS server resolves the DNS request based upon either the original routing determined in block 406, or based upon the modified routing determined in block 420, as determined by decision block 408. In a particular embodiment, the authoritative DNS server appends a counter value to the resolved DNS request if the received DNS request included a status string. For example, authoritative DNS server 312 can resolve the DNS request without appending a counter, such as in DNS reply 336, or the authoritative DNS server can append a counter to the resolved the DNS reply, such as in DNS reply 350.

Based upon the DNS reply sent by the authoritative DNS server, a cache server receives a content request in block 412. For example, one of DNS replies 338 or 352 can be received by client system 324, and the client system can provide a content request to one of cache servers 314 or 316, as directed by the DNS replies. A decision is made as to whether or not the cache server is overloaded in decision block 414. If not, the "NO" branch of decision block 414 is taken, the cache server provides the content in block 422, and the method ends in block 424. For example, the load status of cache server 316 can be such that the cache server is not overloaded when content request 340 is received, and send the requested content 342 to client system 324. If the cache server is overloaded, the "YES" branch of decision block 414 is taken, and a decision is made as to whether or not a counter appended to the content request includes a value that is greater than a counter threshold of the cache server in decision block 416. If so, the "YES" branch of decision block 416 is taken, the cache server provides the content in block 422, and the method ends in block 424. For example, cache server 314 can receive content request 354 and determine that the counter value appended to the content request is greater than a counter threshold for the cache server, and the cache server can provide the content, even if the cache server is overloaded. If the counter appended to the content request includes a value that is not greater than a counter threshold of the cache server, the "NO" branch of decision block 416 is taken, a load status of the cache server is determined and a domain redirection that includes a status string is issued in block 418, and the method ends in block 424. For example, cache server 316 can issue domain redirection 344 that includes the encoded status string.

Figure 6:
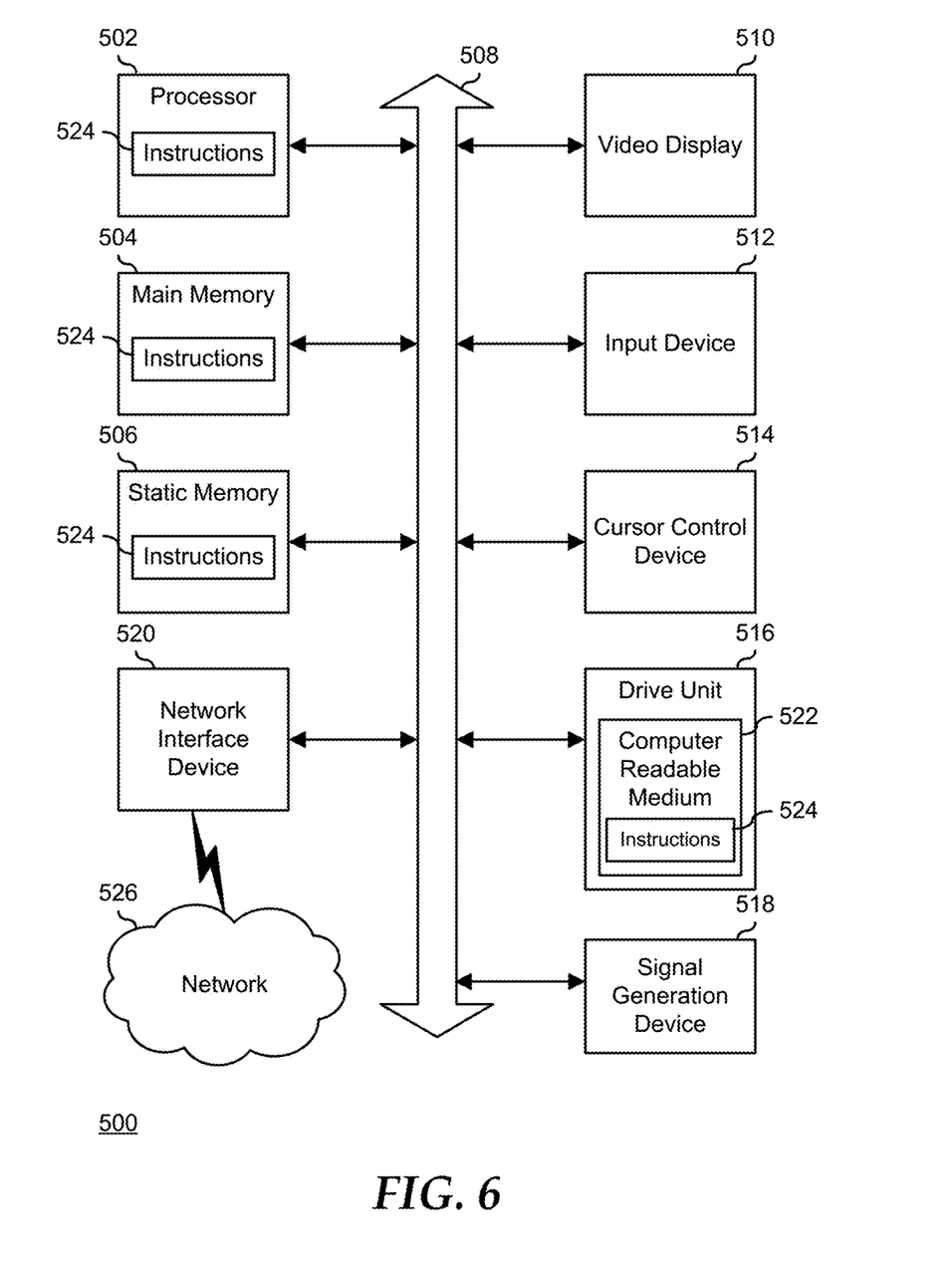
FIG. 6 is an illustrative embodiment of a general computer system.

FIG. 6 illustrates an embodiment of a general computer system 500. The computer system 500 includes instructions that are executed to cause the computer system to perform any one or more of the methods or computer based functions disclosed herein. Computer system 500 may operate as a standalone device or may be connected, such as by using a network, to other computer systems or peripheral devices. Computer system 500 can operate as a server or as a client user computer in a server-client user network environment, or as a peer computer system in a peer-to-peer (or distributed) network environment. Computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing instructions (sequential or otherwise) that specify actions to be taken by that machine. In a particular embodiment, computer system 500 can be implemented using electronic devices that provide voice, video, or data communication. Further, while computer system 500 is illustrated as a single item, the term "system" shall also be taken to include any collection of systems or sub-systems that individually or jointly execute a set of, or multiple sets of instructions to perform one or more computer functions.

Computer system 500 includes a processor 502, a main memory 504, a static memory 506, a video display unit 510, an input device 512, a cursor control device 514, a disk drive unit 516, a signal generation device 518, and a network interface device 520, that can communicate with each other via a bus 508. Processor 502 represents a central processing unit (CPU), a graphics processing unit (GPU), another processing device, or a combination thereof. Video display unit 510 represents a liquid crystal display (LCD), an organic light emitting diode (OLED), a flat panel display, a solid-state display, a cathode ray tube (CRT), another display device, or a combination thereof. In a particular embodiment, input device 512 represents a keyboard, and cursor control device 514 represents a mouse. Alternatively, input device 512 and cursor control device 514 can be combined with video display unit 510 in the form of a touchpad or touch sensitive screen. Disk drive device 516 represents an information storage device including a disk drive, a solid state drive (SSD), an external hard drive, another information storage device, or a combination thereof. Signal generation device 518 represents a speaker, a remote control unit, another device, or a combination thereof. Network interface device 520 communicates with a network 526. Disk drive device 516 includes a computer-readable medium 522 for storing one or more sets of instructions 524. Additionally, main memory 504 and static memory 506 store one or more additional sets of instructions 524. The sets of instructions 524 represent programs, software, firmware, machine-executable code, other instructions, or a combination thereof. Also, instructions 524 can be embedded in a device of computer system 500. In a particular embodiment, instructions 524 represent one or more of the methods or logic as described herein. Processor 502 operates to execute instructions 524 to perform one or more of the methods or logic as described herein.

The previously discussed modules, devices, systems, or other elements (hereinafter "module," can be implemented in hardware, software, or any combination thereof. Each module may include one or more computer systems. When a module includes more than one computer system, the functions of the module can be distributed across the multiple computer systems in a symmetric manner, i.e., each computer system performs the same type of tasks, or in an asymmetric manner, i.e., two computer systems of the module may perform different tasks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
a memory that stores instructions;
a processor that executes the instructions to perform operations, the operations comprising:
returning, in response to determining that a first cache server is overloaded, a domain redirection response including a load status of the first cache server, wherein the domain redirection response includes an encoded status string indicating the load status of the first cache server, and wherein the encoded status string is decoded from a domain name request to enable a client system to determine where to send a content request;
determining, at a domain name system server, that a second cache server can fulfill the content request for a lower network cost than the first cache server, wherein the determining is performed in response to receiving the domain name request;
transmitting, to the client system, a domain name reply that directs the content request to the second cache server, wherein the domain name reply includes a first counter field having a first counter value that provides an indication to the second cache server that the second cache server is a second server to receive the content request, wherein the first counter field indicates a number of domain redirections experienced by the content request; and
preventing, based on the number of domain redirections indicated by the first counter field, a request loop that occurs when the first and second cache server are overloaded.

2. The system of claim 1, wherein the operations further comprise receiving, at the first cache server, the content request from the client system.

3. The system of claim 2, wherein the operations further comprise determining that the first cache server is overloaded in response to receiving the content request from the client system.

4. The system of claim 1, wherein the operations further comprise receiving, at the domain name system server, the domain name request from the client system.

5. The system of claim 1, wherein the operations further comprise determining that the content request includes a second counter field.

6. The system of claim 5, wherein the operations further comprise determining that a second counter value of the second counter field is greater than a counter threshold.

7. The system of claim 6, wherein the operations further comprise providing content in response to the content request if the second counter field is greater than the counter threshold.

8. The system of claim 1, wherein the operations further comprise appending the encoded status string to the domain name request.

9. The system of claim 1, wherein the operations further comprise receiving a load status update from the first cache server.

10. The system of claim 9, wherein the operations further comprise determining a routing behavior based on the load status update.

11. A method, comprising:
returning, in response to determining that a first cache server is overloaded, a domain redirection response including a load status of the first cache server, wherein the domain redirection response includes an encoded status string indicating the load status of the first cache server, and wherein the encoded status string is decoded from a domain name request to enable a client system to determine where to send a content request;
determining, at a domain name system server, that a second cache server can fulfill the content request for a lower network cost than the first cache server, wherein the determining is performed in response to receiving the domain name request, wherein the determining is performed by utilizing instructions from a memory that are executed by a processor;
transmitting, to the client system, a domain name reply that directs the content request to the second cache server, wherein the domain name reply includes a first counter field having a first counter value that provides an indication to the second cache server that the second cache server is a second server to receive the content request, wherein the first counter field indicates a number of domain redirections experienced by the content request; and
preventing, based on the number of domain redirections indicated by the first counter field, a request loop that occurs when the first and second cache server are overloaded.

12. The method of claim 11, further comprising receiving, at the first cache server, the content request from the client system.

13. The method of claim 12, further comprising determining that the first cache server is overloaded in response to receiving the content request from the client system.

14. The method of claim 11, further comprising appending the encoded status string to the domain name request.

15. The method of claim 11, further comprising determining routing based on the encoded status string.

16. The method of claim 11, further comprising determining that the content request includes a second counter field.

17. The method of claim 16, further comprising determining that a second counter value of the second counter field is greater than a counter threshold.

18. The method of claim 17, further comprising providing content in response to the content request if the second counter field is greater than the counter threshold.

19. The method of claim 11, further comprising receiving a load status update from the first cache server.

20. A non-transitory computer-readable medium comprising instructions, which, when loaded and executed by a processor, cause the processor to perform operations, the operations comprising:
returning, in response to determining that a first cache server is overloaded, a domain redirection response including a load status of the first cache server, wherein the domain redirection response includes an encoded status string indicating the load status of the first cache server, and wherein the encoded status string is decoded from a domain name request to enable a client system to determine where to send a content request;

determining, at a domain name system server, that a second cache server can fulfill the content request for a lower network cost than the first cache server, wherein the determining is performed in response to receiving the domain name request;

transmitting, to the client system, a domain name reply that directs the content request to the second cache server, wherein the domain name reply includes a first counter field having a first counter value that provides an indication to the second cache server that the second cache server is a second server to receive the content request, wherein the first counter field indicates a number of domain redirections experienced by the content request; and preventing, based on the number of domain redirections indicated by the first counter field, a request loop that occurs when the first and second cache server are overloaded.

* * * * *